United States Patent
Moule et al.

(10) Patent No.: US 10,594,236 B2
(45) Date of Patent: Mar. 17, 2020

(54) IMPROVEMENTS RELATING TO ELECTRICAL POWER ASSISTED STEERING SYSTEMS

(71) Applicant: TRW Limited, Solihull West Midlands (GB)

(72) Inventors: David Julian Moule, Birmingham West Midlands (GB); Andrew James Stephen Williams, Solihull West Midlands (GB); Jeffrey Ronald Coles, Solihull West Midlands (GB)

(73) Assignee: TRW Limited, Solihull, West Midlands (GB)

( * ) Notice: Subject to any disclaimer, the term of this patent is extended or adjusted under 35 U.S.C. 154(b) by 1251 days.

(21) Appl. No.: 14/443,122

(22) PCT Filed: Nov. 15, 2013

(86) PCT No.: PCT/GB2013/053019
§ 371 (c)(1),
(2) Date: May 15, 2015

(87) PCT Pub. No.: WO2014/076491
PCT Pub. Date: May 22, 2014

(65) Prior Publication Data
US 2015/0311838 A1   Oct. 29, 2015

(30) Foreign Application Priority Data

Nov. 16, 2012   (GB) .................................. 1220688.4

(51) Int. Cl.
*H02P 6/18* (2016.01)
*B62D 5/04* (2006.01)
(Continued)

(52) U.S. Cl.
CPC .............. *H02P 6/18* (2013.01); *B62D 5/0403* (2013.01); *B62D 5/0463* (2013.01);
(Continued)

(58) Field of Classification Search
CPC ........ H02K 11/046; H02K 5/225; H02K 9/06; H02K 3/28
See application file for complete search history.

(56) References Cited

U.S. PATENT DOCUMENTS

| 4,238,719 A | 12/1980 | Bourbeau |
| 2005/0269982 A1* | 12/2005 | Coles ...................... H02P 6/185 318/400.05 |

(Continued)

FOREIGN PATENT DOCUMENTS

| FR | 2608120 A1 | 6/1988 |
| GB | 2435355 A | 8/2007 |

(Continued)

OTHER PUBLICATIONS

Patents Act 1977: Search Report under Section 17, Application No. GB 1220688.4, dated Mar. 11, 2013.
(Continued)

*Primary Examiner* — Shawki S Ismail
*Assistant Examiner* — Zoheb S Imtiaz
(74) *Attorney, Agent, or Firm* — MacMillan, Sobanski & Todd, LLC (57) ABSTRACT

An electric power assisted steering system comprises a motor adapted to apply an assistance torque to a portion of a steering shaft in response to a motor drive signal from a drive circuit, in which the motor comprises a synchronous wound field motor of the kind comprising a stator and a rotor, in which the rotor includes at least one pole and at least one coil winding associated with the pole and the stator comprises a number of phase windings, and in which the
(Continued)

drive circuit which is configured to provide current in the coils of the stator and rotor during operation of the motor.

16 Claims, 8 Drawing Sheets

(51) Int. Cl.
  *H02P 6/185* (2016.01)
  *G01D 5/20* (2006.01)
(52) U.S. Cl.
  CPC ............ *B62D 5/0481* (2013.01); *G01D 5/20* (2013.01); *H02P 6/185* (2013.01)

(56) References Cited

U.S. PATENT DOCUMENTS

| | | | | |
|---|---|---|---|---|
| 2009/0322176 | A1* | 12/2009 | Kusase | H02K 21/042 310/181 |
| 2010/0052587 | A1* | 3/2010 | Bonvin | G11B 19/20 318/400.32 |
| 2010/0123426 | A1* | 5/2010 | Nashiki | H02K 1/12 318/701 |
| 2011/0254393 | A1* | 10/2011 | Yamasaki | H02K 5/18 310/64 |
| 2011/0260696 | A1* | 10/2011 | Nishimura | H02P 9/006 322/28 |
| 2012/0086381 | A1* | 4/2012 | Lipo | H02P 23/0077 318/722 |
| 2012/0126614 | A1* | 5/2012 | Inoue | B60R 16/033 307/10.1 |
| 2012/0229061 | A1* | 9/2012 | Itoh | B60L 3/003 318/400.3 |
| 2012/0299449 | A1* | 11/2012 | Ishikawa | H02K 11/046 310/60 R |
| 2013/0320893 | A1* | 12/2013 | Aoki | B62D 5/0484 318/400.18 |

FOREIGN PATENT DOCUMENTS

| | | |
|---|---|---|
| JP | S6130956 A | 2/1986 |
| JP | 2007006598 A | 1/2007 |

OTHER PUBLICATIONS

PCT International Search Report and Written Opinion, Application No. PCT/GB2013/053019, dated Sep. 8, 2014.

* cited by examiner

IMPROVEMENTS RELATING TO ELECTRICAL POWER ASSISTED STEERING SYSTEMS

CROSS-REFERENCE TO RELATED APPLICATIONS

This application is a national stage of International Application No. PCT/GB2013/053019 filed Nov. 15, 2013, the disclosures of which are incorporated herein by reference in entirety, and which claimed priority to Great Britain Patent Application No. 1220688.4 filed Nov. 16, 2012, the disclosures of which are incorporated herein by reference in entirety.

BACKGROUND OF THE INVENTION

This invention relates to improvements in electric motors in power assisted steering systems for vehicles in which the motor is adapted to apply an assistance torque to a portion of steering shaft in response to a motor drive signal. The invention also relates to electric power assisted steering systems of the kind set forth.

In one known power assisted steering system, a first portion of the shaft is operatively connected to a steering wheel, a second portion of the shaft is operatively connected to at least one steerable wheel, a torque sensor is adapted to produce an output signal indicative of torque applied to the first portion of the shaft by a driver of the vehicle, and control means are adapted to process the output signal in order to produce the motor drive signal.

The first and second portions of shaft may comprise respective portions of a single shaft, or may each comprise a separate shaft.

The purpose of an electric power assisted steering system of the kind set forth is for the motor to apply an assistance torque to the second portion of shaft which makes it easier for the driver to turn the steering wheel. Typically, the motor is controlled using a pulse width modulation strategy with the motor drive signal being proportional to the torque required from the motor.

In the prior art, such as our earlier application GB 9619175 the motor comprises a brushless motor driven by an electrical circuit in which the motor phase windings are connected in a bridge. Each phase is connected into a separate arm of the bridge between a positive and negative (or ground) supply lines. A respective top switching device is connected in series in each arm between a phase winding and the positive supply, and a respective bottom switching device is connected in each arm between a phase winding and the negative (or ground) supply line. Thus, for a 3-phase motor the bridge has 3 arms, each comprising a top and a bottom switching device. The motor can be controlled by pulse width modulating the top and bottom switching devices in the arms in any known manner to cause the motor to rotate.

A problem with brushless permanent magnet motors is that a failure mode exists in which the motor phase windings or parts thereof may be shorted together to form a loop through which an induced current can flow. This typically occurs if two top and/or two bottom devices stick or otherwise fail in a closed state to form a closed path around the electrical circuit. In this failure mode a high braking torque may be generated which may make the steering wheel difficult to turn.

BRIEF SUMMARY OF THE INVENTION

In accordance with a first aspect, the invention provides an electric power assisted steering system comprising a motor adapted to apply an assistance torque to a portion of a steering shaft in response to a motor drive signal from a drive circuit, in which the motor comprises a synchronous wound field motor of the kind comprising a stator and a rotor, in which the rotor includes at least one pole and at least one coil winding associated with the pole and the stator comprises a number of phase windings, and in which the drive circuit which is configured to provide current in the coils of the stator and rotor during operation of the motor.

The drive circuit may apply currents to the coils as required to cause the motor to operate in a synchronous mode, the rotor being fed with a DC current and the stator being provided with AC current.

The motor may have no permanent magnets, relying solely on the interaction of magnetic fields generated by applying current through the rotor and stator windings to produce a drive torque.

The motor may include at least two rotary electrical couplers, or slip rings, and wherein one coupler permits current to be fed from the drive circuit to the at least one rotor coil and the other permits current to be fed back from rotor coil to the drive circuit. The couplers may be bi-directional allowing current to flow across the coupler in either direction.

Each coupler may comprise a first part and a second part, the first part of each coupler being free to rotate along with the rotor and the second part of each coupler being fixed so that it does not rotate with the rotor and connected to the drive circuit, an electrical path being provided between the first and second parts of each coupler. One part of the slip ring may comprise a brush and the other a contact ring.

The rotor winding may comprise a single length of wire that is wound around all of the poles of the rotor, each end of the wire being connected to first part of a respective slip ring.

The rotor may comprise a plurality of poles spaced angularly around the axis of the rotor, each provided with at least one turn of a winding such that as current flows through the coil the pole forms an electromagnet. Each pole may comprise a core of ferromagnetic material, the coil being wound around the core such that the pole functions as an electromagnet when the coil is energised. It may have at least 2 poles, and preferably 6 or 8.

The rotor coil may be wound around the poles such that adjacent poles form magnets of opposite polarity.

The drive circuit may apply a DC voltage across at least one coil of the rotor when a torque is demanded from the motor. This DC voltage may be constant across a range of operating conditions of the motor.

Advantageously the drive circuit may include a switch which can be operated to cause the drive circuit to apply a reduced voltage across the rotor coil when no torque or a low torque is demanded form the motor. It may apply zero voltage when no torque is demanded.

Also advantageously the drive circuit may be operable in use to reduce the voltage applied across the rotor coil to achieve field weakening in a manner similar to permanent magnet AC motor.

By removing the voltage when no torque is required, the poles will cease to function as electromagnets. Thus, when the motor rotates at low speed there will be no cogging torque produced.

Reducing or completely eliminating cogging torque by removing the current provides a significant advantage over prior art permanent magnet motors in electric power steering systems, improving the feel of the system through the steering wheel.

The drive circuit may also be arranged to vary the current applied to the rotor as a function of angular position of the rotor so as to reduce the effect of cogging torque, smoothing out changes in torque that would otherwise occur as the rotor rotates due to the interaction of the field with the stator teeth.

A further advantage of the wound field motor is that in the event of a short circuit in the coils it is possible to reduce the DC current in the rotor windings which stops the motor from generating any braking torque. This is important in a steering system because braking torque may impede the turning of the steering wheel.

Therefore, in one arrangement the drive circuit may be arranged to cause a reduced or zero DC current to flow through the rotor coil in the event that a fault is detected. In particular it may be adapted to remove the current in the event that a short circuit condition is detected around two or more phases of the stator. It may cause no current to flow in the rotor winding in this condition.

In a refinement, the drive circuit may be arranged to modulate the current to match the demand to reduce heating in the motor.

The drive circuit may be arranged to apply a pulse width modulated voltage across the at least one coil of the stator whilst applying a substantially DC voltage to the coil of the rotor.

In practice, the stator may be provided with multiple coils, each defining a phase winding of the stator, and the drive circuit may apply a respective PWM voltage to each phase. The voltages may be applied according to a Space Vector Modulation scheme.

A current measurement circuit may be provided which measures the current flowing in at least one, and preferably all the phases, the drive circuit using the current measurement to assist in deriving the voltages to be applied to each phase of the motor stator.

In a refinement the electric power assisted steering apparatus may include inductance determining means adapted to determine the inductance of the rotor winding, and position determining means adapted to determine the angular position of the motor from the inductance.

The applicant has appreciated that as the rotor rotates past the stator, when a constant current is flowing in the rotor winding, a variation in magnetic flux will occur and hence a variation in magnetic flux linkage per ampere (inductance) will result. This effect may be used to determine the position of the rotor by monitoring the inductance of the rotor winding.

The inductance determining means may be arranged to determine the inductance by applying a varying voltage to the rotor windings and monitoring the rate of rise of current corresponding to the variation in voltage. This variation may comprise a step change, and may be produced by applying a step change to the rotor voltage. This may comprise a pulse, the step changing being defined by the leading or the trailing edge of the pulse. Other waveforms could be used, however, such as a ramp waveform which has a linear or even non linear rise or fall in voltage.

The change in voltage may be applied during known test periods of time when the conditions of the motor are otherwise stable, in particular that stator phase winding currents are stable or are set to zero.

The measured rate of change of rotor current associated with the change in voltage may be correlated with information about the stator winding voltages and currents to determine the inductance.

The change in voltage may be applied at times when the current flowing in the rotor winding is constant. The change in voltage may be applied periodically, the period determining the rate at which the position may be updated.

A current measurement means may be provided which measures the current flowing in the rotor winding. The output of this sensor may be used to determine the inductance. It may measure current constantly or take samples at the time when the voltage is known to be changing.

The position determining means may determine the angular position of the rotor by correlating the changes in inductance as the rotor rotates with known information indicative of the change in inductance with rotor position. This known information may be held in a look up table in an area of electronic memory.

The inductance for any given position may not be unique, in which case the position determining means may determine the position by looking at a range of inductance estimates obtained over time as the rotor rotates, and correlating these values with the stored inductance information until a best fit is found. The change in inductance will typically vary with the geometry of the rotor and stator.

According to a further aspect the invention provides a method of determining the angular position of a rotor of a motor adapted to apply an assistance torque to a portion of a steering shaft in response to a motor drive signal from a drive circuit, in which the motor comprises a synchronous wound field motor of the kind comprising a stator and a rotor, in which the rotor includes at least one pole and at least one coil winding associated with the pole and the stator comprises a number of phase windings, and in which the drive circuit which is configured to provide current in the coils of the stator and rotor during operation of the motor, the method comprising:

Applying a change in voltage to the rotor winding and measuring the current flowing in the rotor winding;

Determining the rate of change of current in response to the application of the change in voltage and from the rate of change estimating the inductance of the rotor; and Estimating the rotor position by correlating the estimated inductance with stored information indicative of the variation of inductance with position.

The stored information may comprise a look up table of inductance and position value pairs.

The method may comprise measuring the current in the rotor winding to determine the rate of change of current.

The method may comprise applying a change in voltage by applying a step change in voltage, perhaps by applying a short duration pulse.

Other advantages of this invention will become apparent to those skilled in the art from the following detailed description of the preferred embodiments, when read in light of the accompanying drawings.

DETAILED DESCRIPTION OF THE INVENTION

Figure 1:
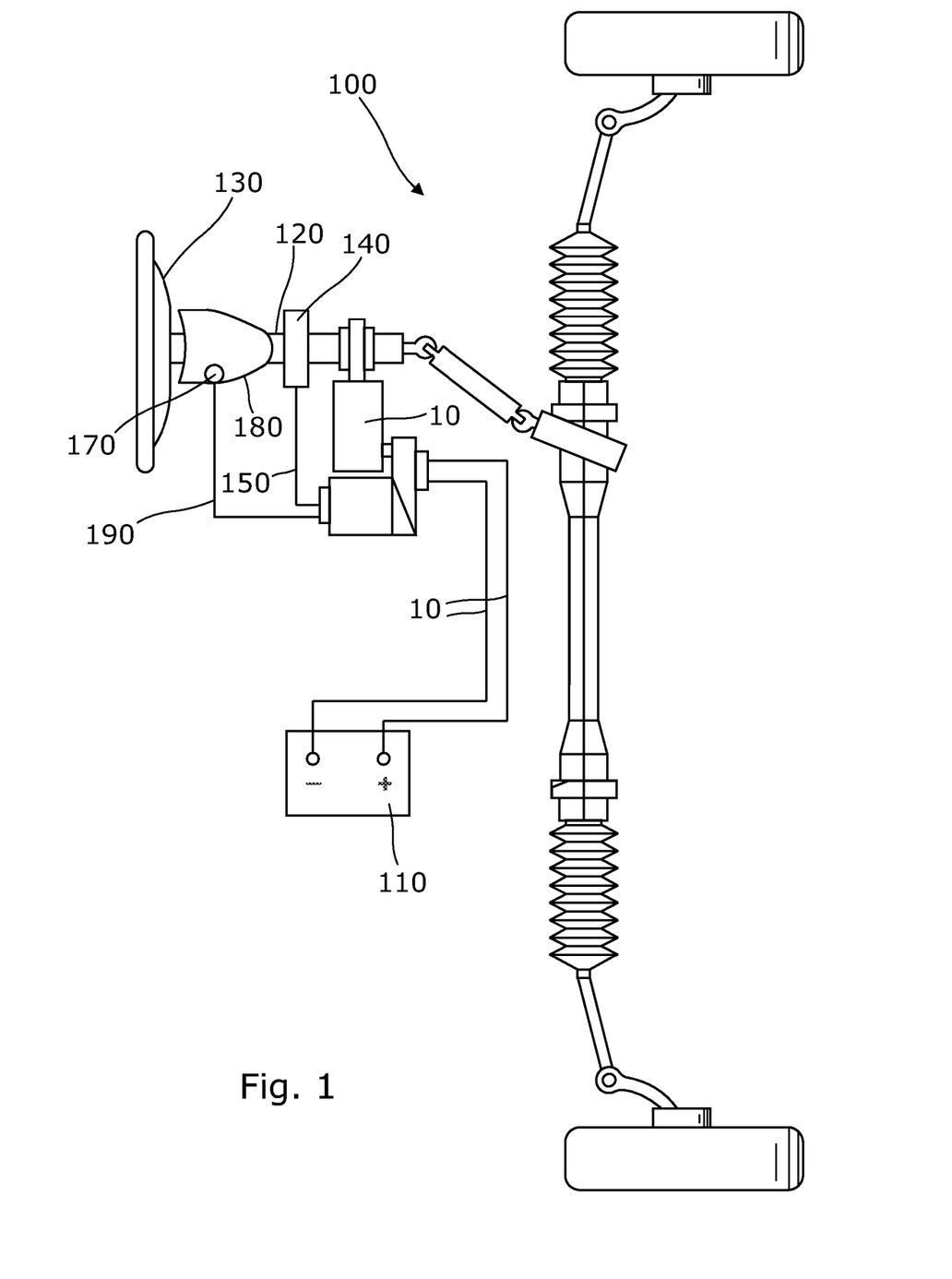
FIG. 1 is a schematic illustration of an electric power assisted steering system in accordance with the invention.

The electrical power assisted steering system 100 shown in FIG. 1 of the accompanying drawings comprises an input shaft in the form of a length of steering column shaft 120 connected to a steering wheel 130 for the vehicle.

A torque sensor 40 is adapted to measure the torque applied to a first portion of the steering column shaft by a driver as the steering wheel is turned. The sensor produces an output signal which is fed by electrical wires 150 to an electrical circuit 160. An output signal from a vehicle ignition switch 170 provided on a steering column shroud 180 is also fed along wires 190 to the control until to provide an indicator as to when the power assistance assembly should operate (although the ignition does not form a part of the power steering assembly).

The control unit 6 comprises an electrical circuit which is connected by wires to a battery 11 or other source of electrical power.

The circuit processes the output signal from the torque sensor to produce a speed or torque demand signal proportional to the torque required from an electric motor 10 which is connected to a second portion of the steering column shaft 120 through a gearbox 130.

In use, the motor 10 is driven in response to the speed or torque demand signal to apply an assistance torque to the shaft 120.

Of course, other configurations are possible, as long as there is a motor which applies some assistance torque to a part of a steering system, and this example should not be considered to be limiting to the invention. For instance, the motor may act directly upon the steering rack rather than the steering shaft, and the torque sensor could be replaced by some other means of monitoring steering demand.

Figure 2:
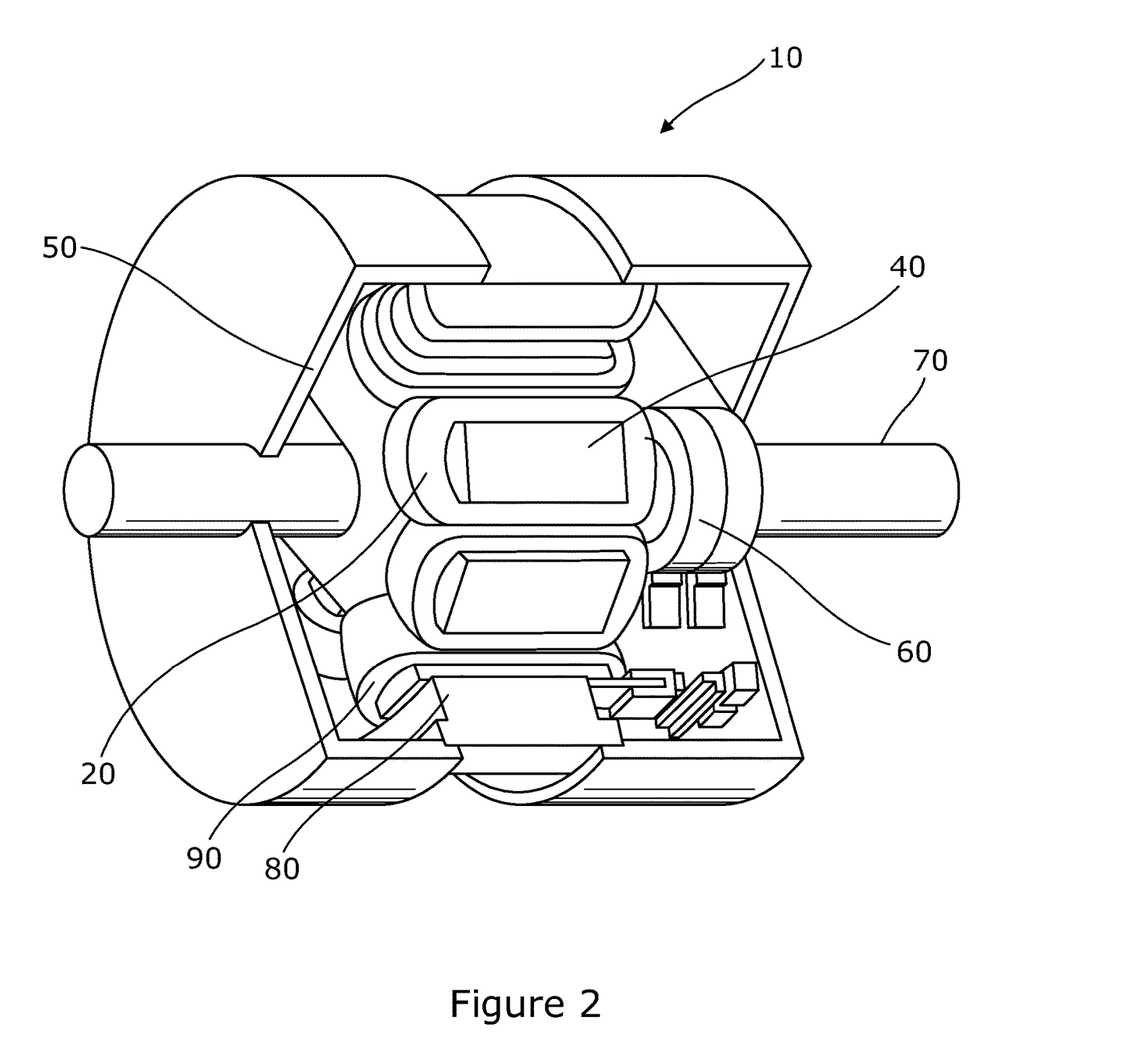
FIG. 2 is an illustration of a wound field motor used in the system of FIG. 1.

The motor 10 is shown in schematic form in FIG. 2. This includes a cut away of a part of the motor revealing the internal parts of the motor.

Figure 8:
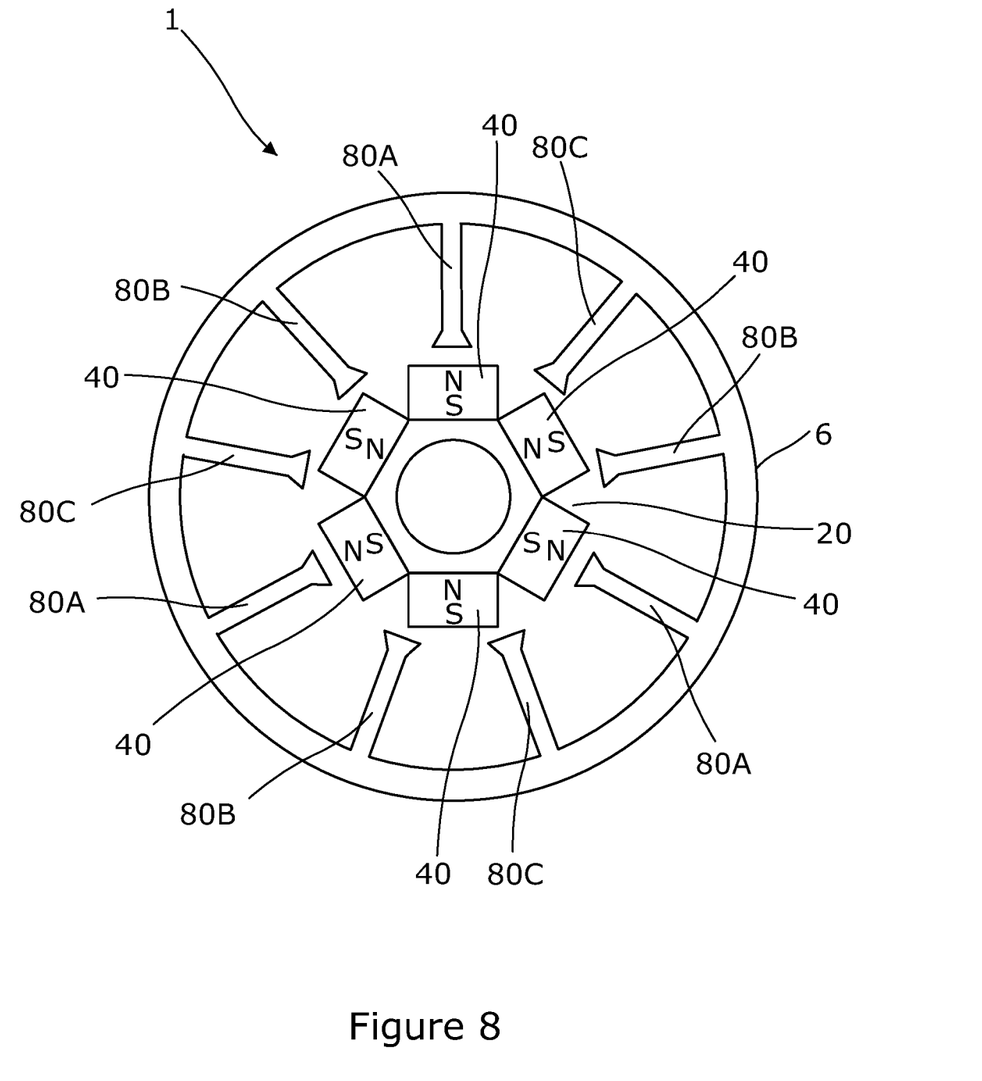
FIG. 8 is a cross section through the motor of FIG. 2 showing the polarity of the electromagnets as a DC voltage is applied across the rotor winding.

As can be seen, by way of example, the motor 10 comprises a wound field motor which has no permanent magnets. Instead, the rotor comprises a rotor body 50 with multiple ferromagnetic poles 40 spaced around the circumference of the rotor body. A length of conductive wire defining a rotor coil 20 is wound many times around the poles such that on application of a DC current to the coil each pole 40 forms an electromagnet. The windings are arranged so that polarity of the magnets varies around the rotor between N and S poles as shown in FIG. 8 when the DC voltage is applied.

The two ends of the coil winding 20 are connected to respective slip rings 60 provided around a support shaft 70 for the rotor. Each ring provides an electrical path between the end of the winding 20 and a respective output of a drive circuit 200 described hereinafter.

The rotor is axially aligned within a cylindrical stator. The stator has a number of poles 80, for example 8. Three lengths of conductive wire are wound around selected poles to form three phase windings A, B and C. The interior of the stator is complementary to the exterior surface of the rotor structure so that only a small air gap is present. The wires are connected together at a star point and the ends of each wire are connected to respective outputs of a drive circuit described hereinafter.

The motor 10 therefore comprises a three phase device, each phase for convenience being labelled A, B and C respectively.

Figure 3:
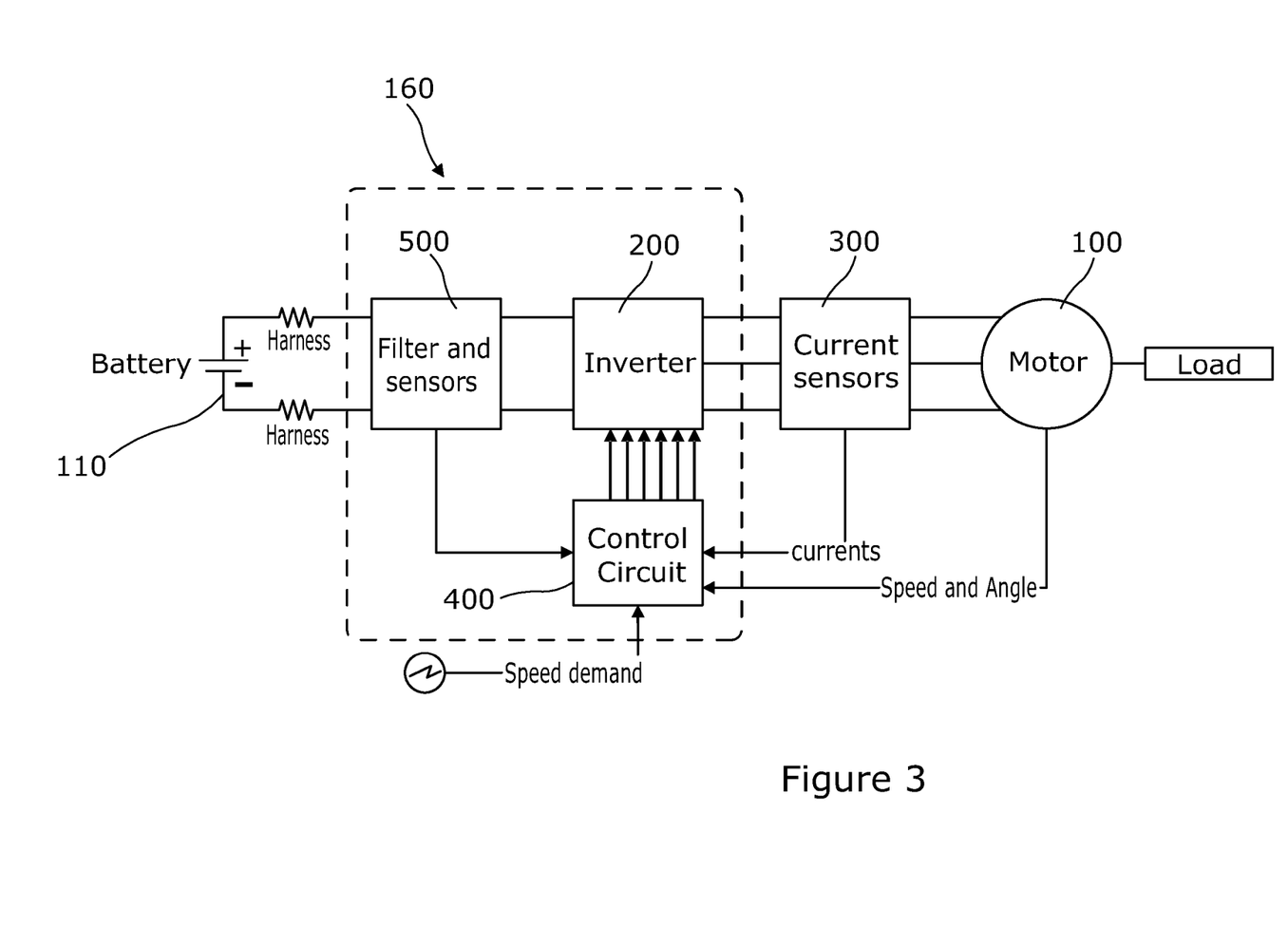
FIG. 3 is a schematic overview of the electrical circuit of the system of FIG. 1.

The motor circuit 160 comprise a control circuit and a drive circuit and is shown schematically in FIG. 3. The drive circuit comprises an inverter circuit 200 which produces respective PWM voltages to be applied to each stator phase A, B, C, a current sensor 300 that monitors the resulting phase currents, and a control circuit 400 which provides a voltage demand signal to the inverter according to a demanded speed signal and the measured currents. The inverter 200 is provided with power from the battery 110 which has been filtered to remove electrical noise by a filter 500. The PWM voltages can be derived according to a variety of strategies, for instance using a space vector modulation strategy as described in WO 2004/023639 the teachings of which are incorporated herein in its entirety.

Figure 4:
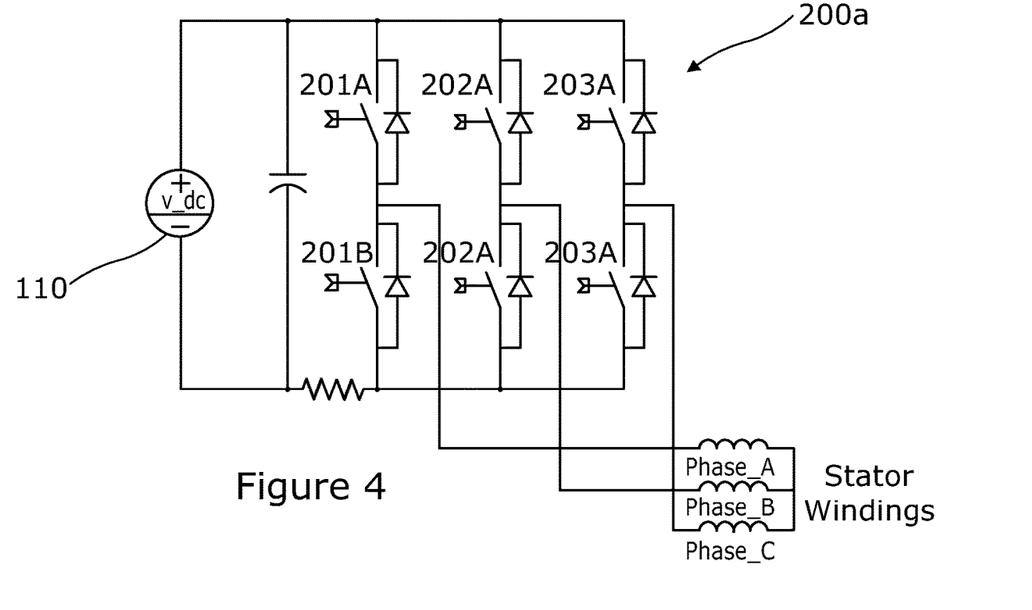
FIG. 4 is an illustration in more detail of the drive circuit for the stator windings.

A simple inverter circuit 200a forming a first part of the drive circuit 200 is illustrated in more detail in FIG. 4 of the drawings. It comprises pairs of switches 201, 202, 203 arranged in a bridge, a top switch and a bottom switch of each pair connecting an end of a respective phase to the supply voltage or to ground. The switches 201,202,203 can each be open of closed so that there are in total eight possible states for the switches, each state being a unique combination of open and closed switches. The controller determines the sequence of states within each PWM period that is needed to cause the motor to turn at the demanded speed.

Figure 6:
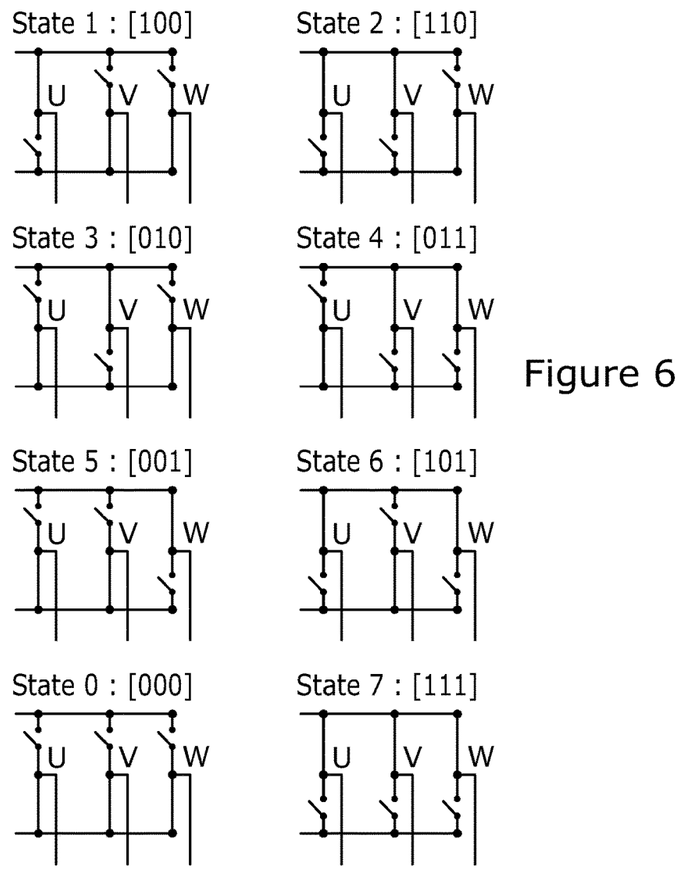
FIG. 6 is a diagram showing the various states of the motor of FIGS. 1 and 2.

Each winding in a three phase system can only be connected to either the supply rail or the ground line and there are therefore eight possible states of the control circuit. These are shown in FIG. 6. Using 1 to represent one of the phases being at positive voltage and 0 to represent a phase connected to ground, state 1 can be represented as [100] indicating phase U at 1, phase V at 0 and phase W at 0, State 2 is represented as [110], state 3 as [010], state 4 as [011], state 5 as [001], state 6 as [101], state 0 as [000] and state 7 as [111]. Each of states 1 to 6 is a conducting state in which current flows through all of the windings 2, 4, 6, flowing in one direction through one of them and in the other direction through the other two. State 0 is a zero volt state in which all of the windings are connected to ground and state 7 is a zero volt state in which all the windings are connected to the supply rail.

States 1, 2, 3, 4, 5 and 6 are herein also referred to as states +U, −W, +V, −U, +W and −V respectively, because they each represent the states in which the voltage applied across the windings is in a positive or negative direction for a respective one of the phases. For example in the +U state the U phase is connected to the supply rail and the other two phases are connected to the ground link, and in the −U state the connections are reversed.

When the circuit is being controlled to produce pulse width modulation, each of the phases will normally be turned on and off once in each PWM period. The relative lengths of time that are taken up in each state will determine the magnitude and direction of the magnetic field produced in each winding, and hence the magnitude and direction of the total torque applied to the rotor. These lengths of time can be calculated by various modulation algorithms but in this embodiment a space vector modulation technique is used.

Figure 5:
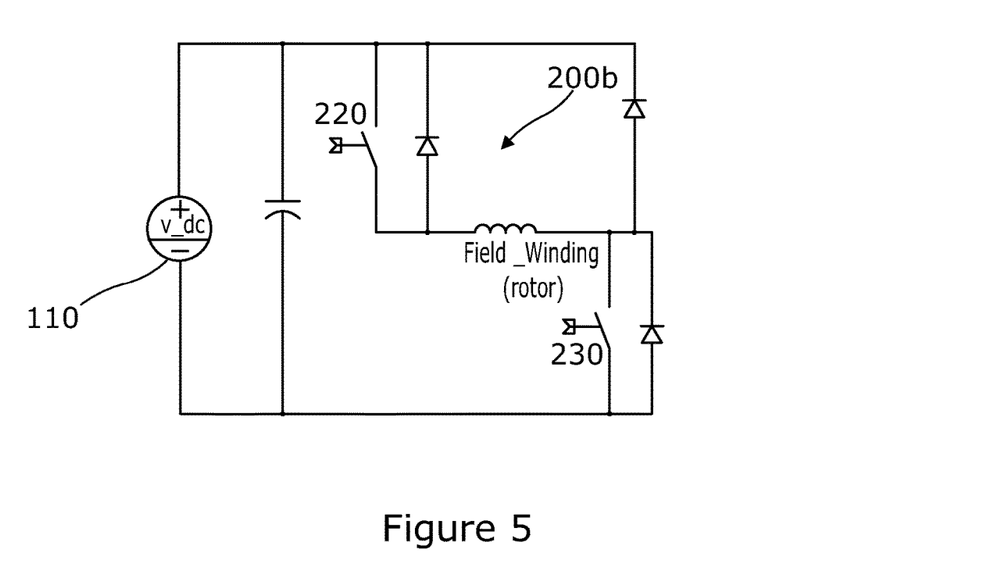
FIG. 5 is a corresponding illustration of the drive circuit for the rotor filed windings.
Figure 7:
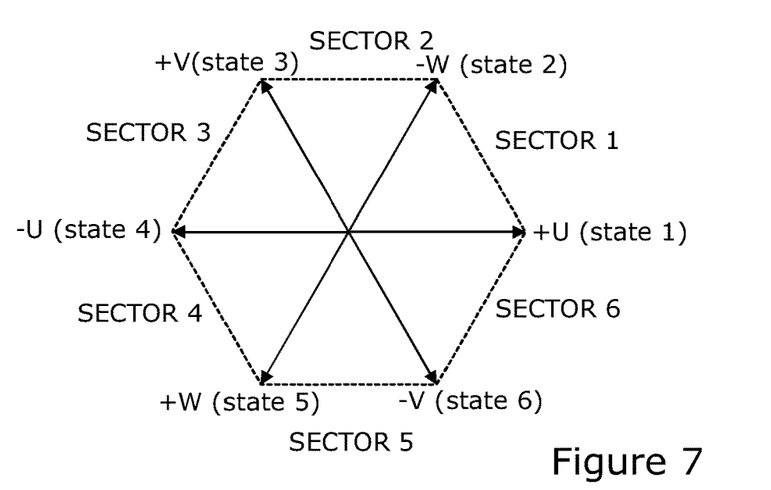
FIG. 7 is a state vector diagram used to illustrate operation of the drive circuit.

Referring to FIG. 7, in state vector modulation systems, the times in each PWM period spent in each of the states are represented as state vectors in a state vector modulation (SVM) diagram. In this type of diagram, single state vectors are those in the directions of the vectors S1 to S6, and the length of the vectors in each of these directions represents the amount of time in each PWM period spent in the respective state. This means that any desired voltage in the windings can be represented as a point on the diagram which corresponds to a voltage vector which represents the magnitude and direction of the voltage, and can be produced by a combination of state vectors s1, s2, etc. the length of which represent the time in each PWM period spent in that state. Alternatively if certain states are required for other reasons, such as current measurement, a combination of states with zero net voltage can be used A second part 200b of the drive circuit 200 is used to apply a DC voltage across the rotor coil. This turns on the electromagnets formed by each pole. The circuit is shown in FIG. 5. It includes a switch 220 which is opened when no torque is demanded from the motor to turn off the rotor electromagnets. This switch 220 is controlled by the controller. Turning off the electromagnets ensures that no cogging torque is produced. For resilience, a second switch 230 is also provided in series with the motor windings.

The control circuit 300 is also arranged to turn off the current in the rotor coil in the event that a failure mode corresponding to a short circuit within the stator phases has occurred. This again turns off the rotor electromagnets and removes the risk of the motor generating a braking torque in such a failure mode. This is achieved by opening the switch 220 or 230 (or both) of the drive circuit part 200b. The short circuit may be detected by comparing a measured current with an expected current flowing in the rotor or stator. The expected current can be easily determined, for example by monitoring the d-q axis current demands of individual phase current demands in a PWM modulation scheme. The current can be easily measured using one or more current sensors in series with one or more of the motor phases.

Figure 9:
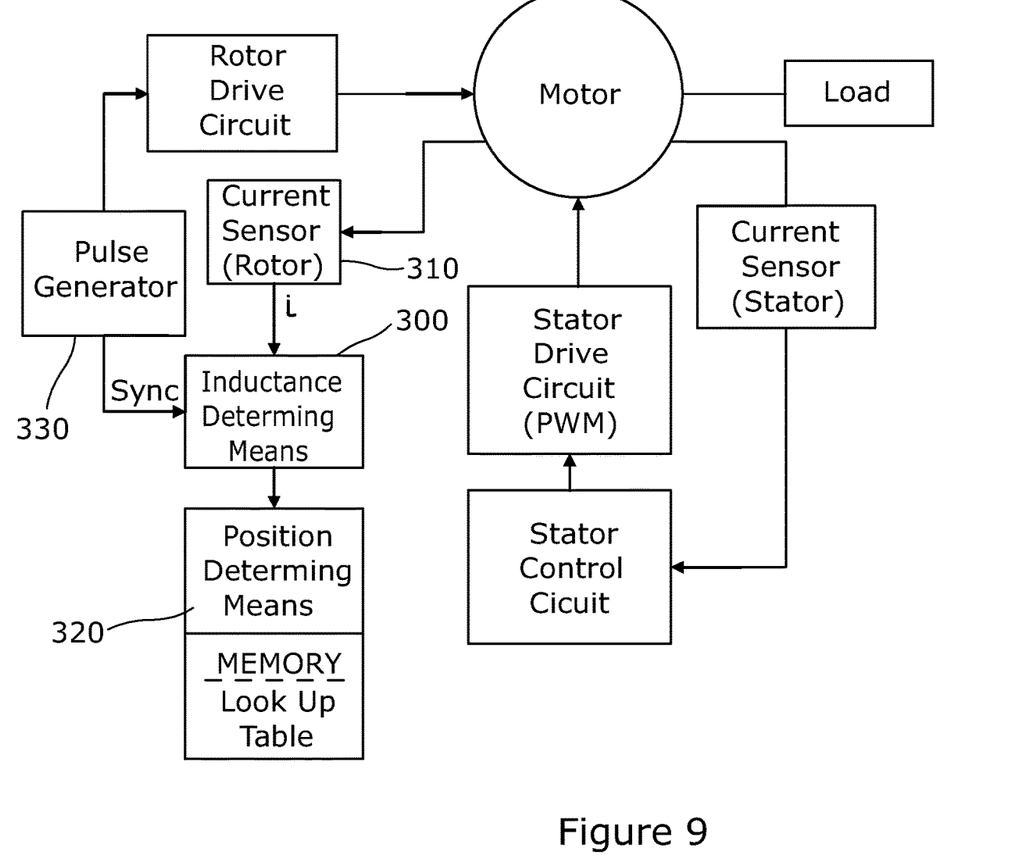
FIG. 9 is a diagram showing an alternative embodiment which includes means for determining the position of the rotor.
Figure 10:
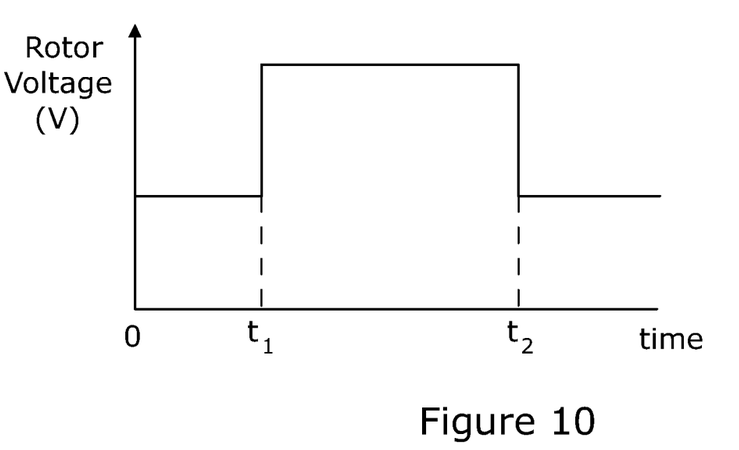
FIG. 10 is a plot of rotor voltage against time showing the application of a test pulse.
Figure 11:
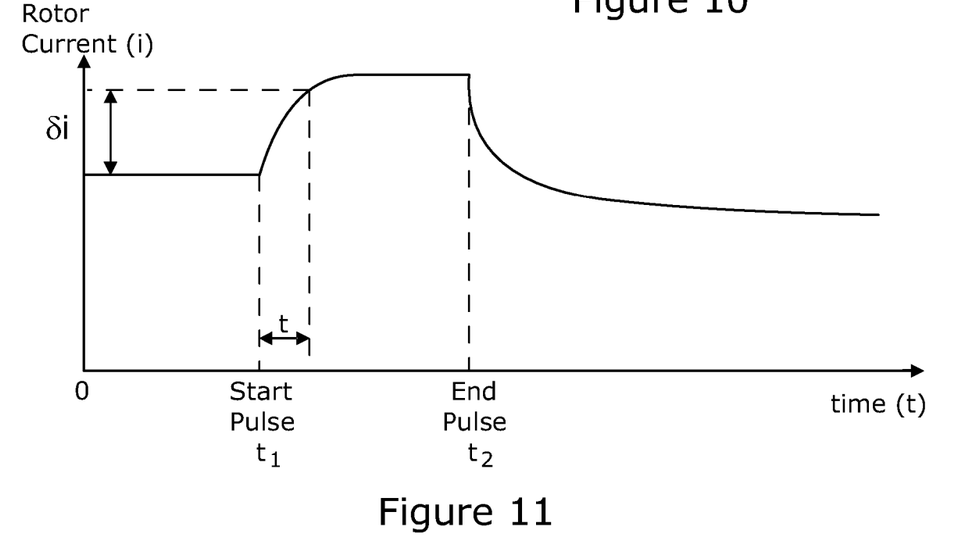
FIG. 11 is a corresponding plot of rotor current against time showing the resulting variation in rotor current.
Figure 12:
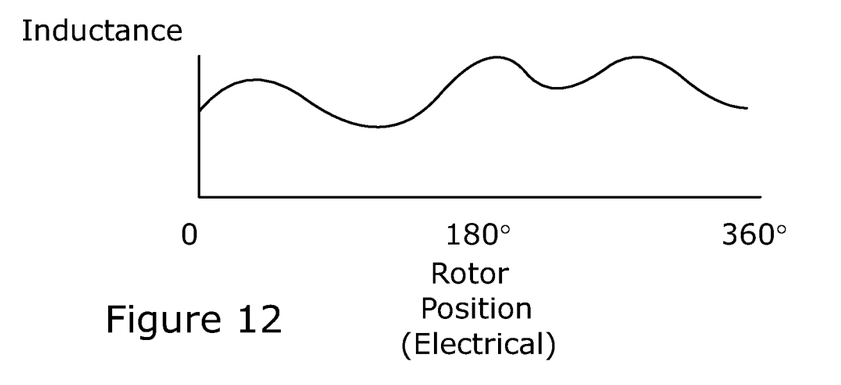
FIG. 12 is a plot of inductance against rotor position.

In a modified embodiment shown in FIG. 9, the system additionally includes an inductance determining means 300, a rotor current sensor 310 and a rotor position determining means 320. The inductance determining means works alongside the control circuit and causes short duration voltage pulses to be applied to the rotor winding on top of the steady voltage that is applied to the winding during normal operation. The pulses are generated by a pulse generator 330. The pulse will cause an increase in the current in the winding which lags behind the rising edge and a decrease that lags behind the trailing edge. The lag is due, at least in part, by the inductance of the winding. This is shown in FIG. 10. The inductance will vary with the angular position of the rotor relative to the stator as shown in FIG. 12.

The pulses are applied periodically and at times when the control circuit is demanding a known voltage and current from the stator windings, and when it is known that the current and voltage demanded from the stator windings is constant.

The current sensing means 310 measures the current flowing through the rotor winding. This comprises, in this example, a resistive element in series with the winding, the voltage dropped across the element being measured and converted into a current measurement by applying ohms law to the voltage and known resistance of the element.

The measured current is processed to determine the rate of change of current over time corresponding to the rate of increase of current as the pulse is applied (or rate of decrease at the trailing edge) and the inductance is determined from this rate of change. Generally an increase in inductance will lead to a slower rise (or fall) rate. One simple way to do this is to measure the time t taken for the current to rise by a set amount delta I following the application of a voltage pulse, and compare the measured rise time with correlated inductance/position information held in a look up table in the memory.

The determined inductance is then used to provide an estimate of rotor position. This is achieved using an algorithm which receives as an input the inductance and which has access to stored inductance/position information stored in an electronic memory in a look up table. The input inductance is located in the look up table and the position is then read out.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. An electric power assisted steering system comprising a motor adapted to apply an assistance torque to a portion of a steering shaft in response to a motor drive signal from a drive circuit, in which the motor comprises a synchronous wound field motor of the kind comprising a stator and a rotor and wherein the synchronous wound field motor does not contain any permanent magnets, in which the rotor includes at least one pole and at least one coil winding associated with the at least one pole and the stator comprises a number of phase windings, and in which the drive circuit which is configured to provide current in coils of the stator and rotor during operation of the motor.

2. The electric power assisted steering system according to claim 1 in which the drive circuit in use applies currents to the coils as required to cause the motor to operate in a synchronous mode, the rotor being fed with a DC current and the stator being provided with AC current.

3. The electric power assisted steering system according to claim 1 in which the motor relies solely on the interaction of magnetic fields generated by applying current through the rotor and stator windings to produce a drive torque.

4. The electric power assisted steering system according to claim 1 in which the motor includes at least two rotary electrical couplers, and wherein one coupler permits current to he fed from the drive circuit to the at least one rotor coil and the other coupler permits current to be fed hack from rotor coil to the drive circuit.

5. The electric power assisted steering system according to claim 4 in which the rotor comprises a plurality of poles spaced angularly around an axis of the rotor, each pole provided with at least one turn of a winding such that as current flows through the coil the pole forms an electromagnet and in which the drive circuit is use applies a DC voltage across at least one coil of the rotor when a torque is demanded from the motor.

6. The electric power assisted steering system according to claim 5 in which the drive circuit includes a switch which can be operated to cause the drive circuit to apply a reduced, or zero, voltage across the rotor coil when no torque or a low torque is demanded from the motor.

7. The electric power assisted steering system according to claim 5 in which the drive circuit is arranged to vary the current applied to the rotor as a function of angular position of the rotor so as to reduce the effect of cogging torque, smoothing out changes in torque that would otherwise occur as the rotor rotates due to the interaction of a field with stator teeth.

8. The electric power assisted steering system according to claim 5 in which the drive circuit is arranged to cause a reduced or zero DC current to flow through the rotor coil in the event that a fault is detected.

9. The electric power assisted steering system according to claim 5 in which the drive circuit is arranged to apply a pulse width modulated voltage across at least one coil of the stator whilst applying a substantially DC voltage to the coil of the rotor.

10. The electric power assisted steering system according to claim 1 comprising an inductance determining means arranged to determine an inductance of at least one winding of the rotor by applying a varying voltage to the rotor windings and monitoring a rate of rise of current corresponding to the variation in voltage.

11. The electric power assisted steering system according to claim 10 further comprising means for correlating the rate of rise of current with information about the stator winding voltages and currents to determine the inductance and position determining means arranged to determine the angular position of the rotor by correlating the changes in inductance as the rotor rotates with known information indicative of the change in inductance with rotor position.

12. A method of determining an angular position of a rotor of a motor adapted to apply an assistance torque to a portion of a steering shaft in response to a motor drive signal from a drive circuit, in which the motor comprises a synchronous wound field motor of the kind comprising a stator and a rotor and wherein the synchronous wound field motor does not contain any permanent magnets, in which the rotor includes at least one pole and at least one coil winding associated with the at least one pole and the stator comprises a number of phase windings, and in which the drive circuit which is configured to provide current in coils of the stator and rotor during operation of the motor, the method comprising:
    applying a change in voltage to the rotor winding and measuring a current flowing in the rotor winding;
    determining a rate of change of current in response to the application of the change in voltage and from the rate of change estimating an inductance of the rotor; and
    estimating a rotor position by correlating the estimated inductance with stored information indicative of a variation of inductance with position.

13. The method according to claim 12 in which the stored information comprises a look up table of inductance and position value pairs.

14. The method according to claim 12 which comprises measuring the current in the rotor winding to determine the rate of change of current.

15. The method according to claim 12 which comprises applying a change in voltage by applying a step change in voltage.

16. The method according to claim 15, wherein the step change in voltage is applied by the application of a short duration pulse.

* * * * *

UNITED STATES PATENT AND TRADEMARK OFFICE
CERTIFICATE OF CORRECTION

PATENT NO. : 10,594,236 B2  
APPLICATION NO. : 14/443122  
DATED : March 17, 2020  
INVENTOR(S) : David Julian Moule et al.

Page 1 of 1

It is certified that error appears in the above-identified patent and that said Letters Patent is hereby corrected as shown below:

In the Claims

Column 8, Claim 4, Line 54, please correct:
"to he fed"
To:
--to be fed--

Column 8, Claim 4, Line 55, please correct:
"current to be fed hack from"
To:
--current to be fed back from--

Signed and Sealed this  
Nineteenth Day of May, 2020

Andrei Iancu  
*Director of the United States Patent and Trademark Office*